United States Patent [19]

Newcome, III et al.

[11] Patent Number: 4,631,358

[45] Date of Patent: Dec. 23, 1986

[54] DEVICE AND METHOD FOR ARTICLE STORAGE AND RELEASE

[76] Inventors: Thomas W. Newcome, III, 66 E. 9th St., St. Paul, Minn. 55101; Mark H. Kartarik, 810 Thornton St., SE., Minneapolis, Minn. 55414

[21] Appl. No.: 579,669

[22] Filed: Feb. 14, 1984

[51] Int. Cl.[4] .......... G07F 11/00; H04M 11/04

[52] U.S. Cl. .......... 379/45; 221/91; 379/104

[58] Field of Search .......... 179/5 R, 5 P; 70/63; 194/4 C; 221/5, 89, 12, 91; 235/381; 340/825.31, 825.35

[56] References Cited

U.S. PATENT DOCUMENTS

| | | | |
|---|---|---|---|
| 2,235,526 | 3/1941 | Lucas | 70/447 |
| 3,084,008 | 4/1963 | Mallett | 312/319 |
| 3,695,067 | 10/1972 | Bays | 70/63 |
| 3,831,065 | 8/1974 | Martin | 340/825.31 |
| 3,905,461 | 9/1975 | Davies et al. | 194/4 C |
| 3,934,434 | 1/1976 | Law | 70/63 |
| 3,979,932 | 9/1976 | Piche | 70/63 |
| 4,232,354 | 11/1980 | Mueller et al. | 340/825.31 X |
| 4,318,288 | 3/1982 | Rifat | 70/252 |

FOREIGN PATENT DOCUMENTS

| | | | |
|---|---|---|---|
| 2405524 | 6/1979 | France | 194/4 C |
| 1183336 | 3/1970 | United Kingdom | 194/4 C |

*Primary Examiner*—Keith E. George

*Attorney, Agent, or Firm*—Anthony G. Eggink

[57] ABSTRACT

The electronic digitally operated device is for releasably storing an article which is dispensible to a location accessible to a user having been provided with a changeable predetermined code. The device has a tamper resistent article storage structure that is accessible to the proprietor of the device. An article release mechanism communicates to an externally accessible location and is located in the article storage structure. A code receiving mechanism having a changeable code setting portion is provided for a proprietor to enter a predetermined code. A code input portion is located at an externally accessible location for input of the predetermined code by a user, and a signal output portion is in communication with the article release mechanism. A power source is provided in communication with the code receiving mechanism to activate the article release mechanism to release the stored article to a user at the externally accessible location. Also provided, are methods for article storage and limited release.

13 Claims, 9 Drawing Figures

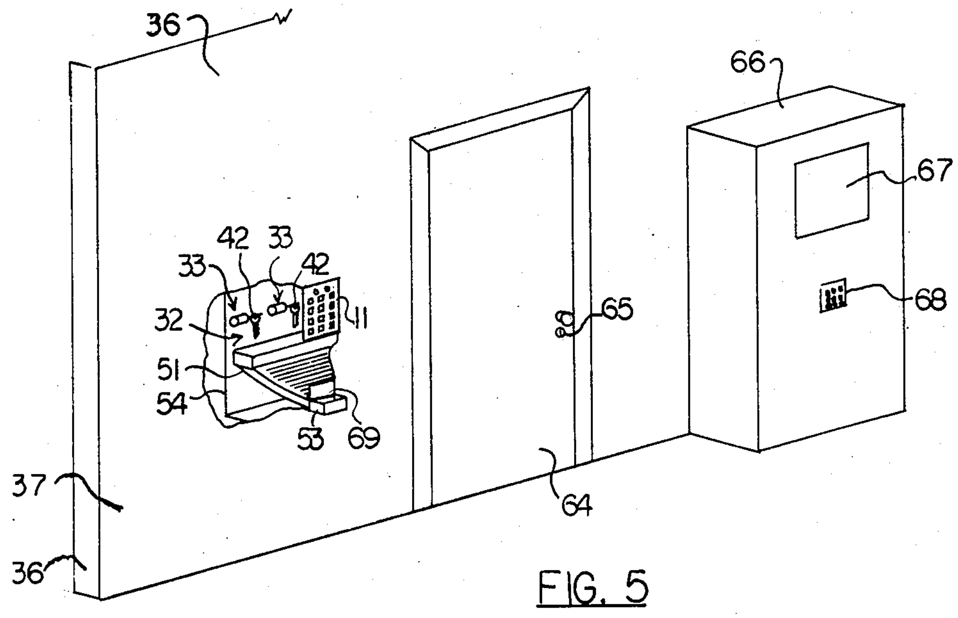
FIG. 5
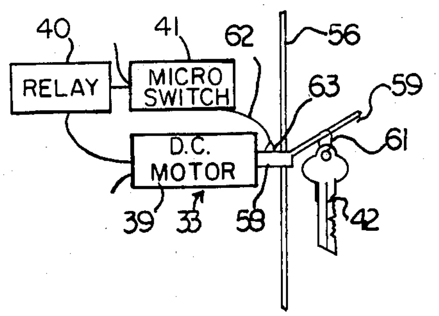
FIG. 6
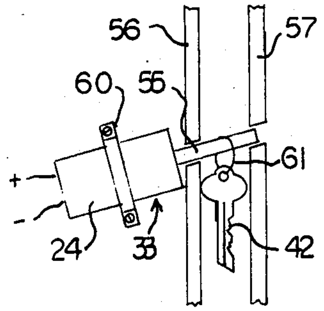
FIG. 7
FIG. 8
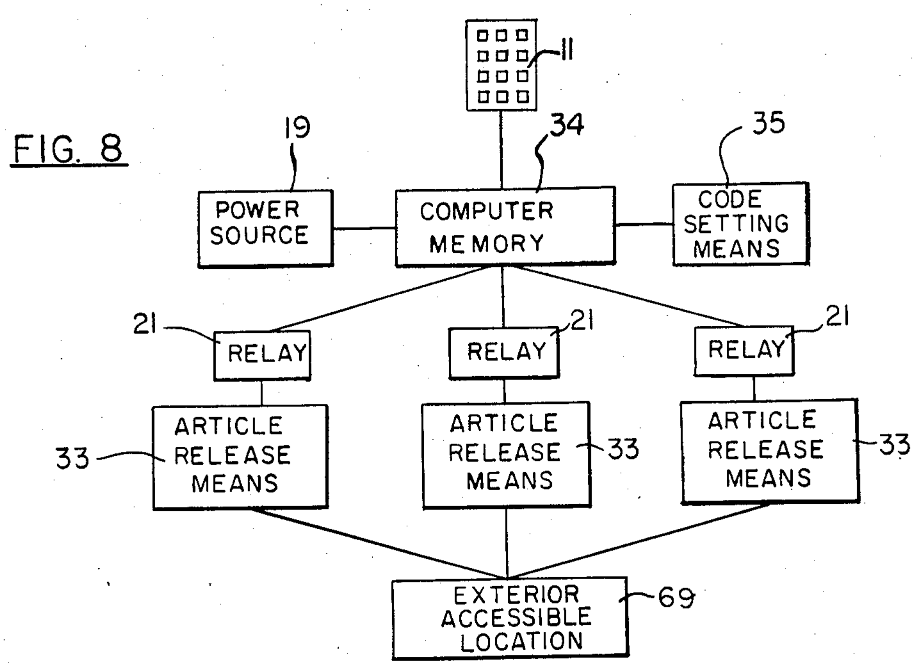

DEVICE AND METHOD FOR ARTICLE STORAGE AND RELEASE

BACKGROUND OF THE INVENTION

This invention relates to a device and method for the storage and release of articles. Particularly, this invention relates to a device and method utilizing a code input mechanism having a preset and changeable input code for protectably storing and releasing a key for access to a building by a user having been provided the preset code.

In the past, various types of devices have been proposed to provide limited access to articles, such as keys. These devices have generally consisted of conventional key lock mechanisms and combination lock mechanisms with openable housings to safeguard the keys therein. Additionally, devices have been proposed to safeguard access to automobile steering columns and to otherwise provide limited access for the use of automobiles and the entry to buildings. These devices, however, are generally unrelated to the teachings of this invention.

For example, one prior art device discloses an electronic push button combination lock which provides an unlocking signal to open door locks at hotel and motel rooms. These prior art devices have generally been complex in construction, difficult to manufacture and inherently limited in use.

Since the advent of computer micro chips, electronic devices have been developed utilizing push button pads and the memory of the computer to manufacture electronic devices for use with electric garage door openers, security systems and manufacturing processes. These devices provide an owner with the input of a large combination of easily and quickly changeable input codes for limiting access to those having been provided the preset code.

The electronic digitally operated device of this invention utilizes a memory type electronic device to provide an access article (such as a key for a house, apartment, business or condominium) to a user having been provided with a changeable, predetermined code. The devices and methods of this invention are useful in emergency, as well as commonly encountered, situations to enable users to receive the safeguarded article upon proper entry of a code. And, the devices and methods provide this limited access in a unique, effective manner without the shortcomings and limitations of the prior art devices.

SUMMARY OF THE INVENTION

The electronic digitally operated device of this invention is for releasably storing an article. The device dispenses articles, such as keys or the like, to a location accessible to a user having been provided with a changeable predetermined code.

The device has a tamper resistent article storage structure which is accessible to the proprietor of the device. An article release mechanism is located in the article storage structure and the release mechanism is in communication with an externally accessible location for the user of the device.

A changeable code setting means in communication with a memory or logic portion is located within the interior of the storage structure for a proprietor to enter a predetermined code. A code input pad having a plurality of keys is located at an externally accessible location for the input of the predetermined code by a user. A signal output portion in communication with the article release mechanism is activated if the predetermined code set by the proprietor and the input code entered by the user are the same, as determined by the memory or logic portion.

A power source is in communication with the various elements of the device so that the signal output portion provides a signal for activating the article release mechanism to release the stored article to a user at the externally accessible location.

Additionally provided by the invention are article storage means of various configurations to make the invention useful to a variety of proprietor requirements. Also provided are article release means of various configurations which effectively release stored articles to users, i.e., through chute portions for exterior article access.

Further, provided by the invention are methods for storing and releasing articles as well as providing users with predetermined codes in usual as well as emergency situations.

These and other benefits of this invention will become clear from the following description, by reference to the drawings.

BRIEF DESCRIPTION OF THE DRAWINGS

FIG. 5 is a perspective schematic view of another embodiment of the article storage and release device of this invention which illustrates a plurality of article release mechanisms in use with a single code input pad and a single article access means;

FIG. 6 is a schematic side plan view of an article release mechanism of the article storage and release device of this invention;

FIG. 7 is a schematic side plan view of another embodiment of an article release mechanism of the article storage and release device of this invention;

FIG. 8 is a schematic diagram which illustrates the operation and method of storing and releasing articles according to the teachings of this invention.

DESCRIPTION OF THE PREFERRED EMBODIMENTS

Figure 1:
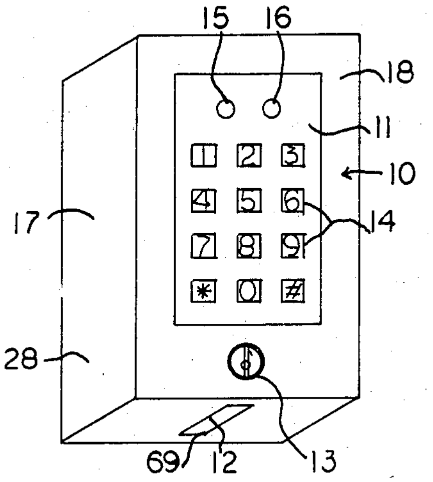
FIG. 1 is a perspective schematic view of one embodiment of the electronic digitally operated article device of this invention.

Referring to the drawing, FIG. 1 is a perspective view of the electronic, digitally operated device 10 and it is shown as having a code input means or digital input pad 11 with numeric keys 14. The digital input pad 11 is mounted on the exterior of a tamper resistent housing 28.

The housing 28 is generally a separable two part unit having a front body portion 18 and a rear body portion 17. The body portions 17 and 18 are separable and lockable by a key receiving structure 13 and a cooperating lock mechanism 30. At the bottom of housing 28 is an article access means or slotted aperture 12 through which the key or article 42 is dropped subsequent to the entry of a predetermined code by use of the numeric or digital keys 14 of keypad 11.

Figure 2:
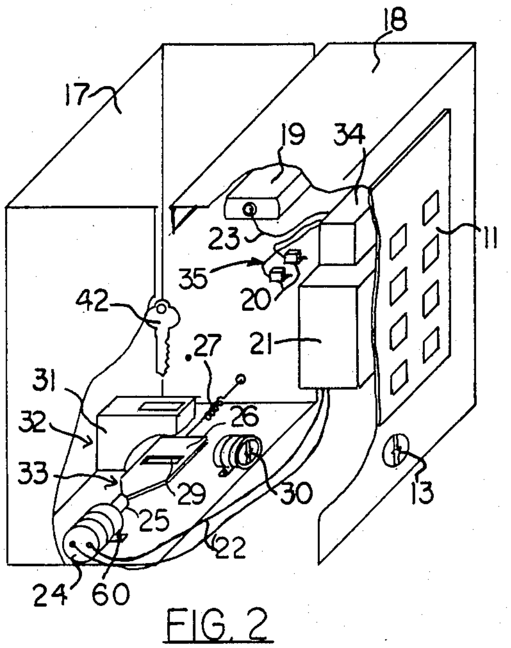
FIG. 2 is a perspective schematic cut-away view of the article device shown in FIG. 1 having its housing structure in an open configuration to show elements contained therein.

Optionally located above the numeric digital keypad 11 are indicator lights 15 and 16 which indicate whether the device is operable, i.e., active energy source, or which can be utilized to indicate a certain mode for programming the unit or to provide light to pad 11 during times of darkness. P FIG. 2 illustrates the device of FIG. 1 having its front body portion 18 separated from the back portion 17. The cut-away view of the respective panel portions 17 and 18 show the interior of the housing structure 28 to have a code receiving means or logic portion 34 which receives a changeable predetermined code. The logic portion 34 receives the changeable code from code setting means 35, such as programming switches or pins 20, which permit the proprietor or device operator to enter a changeable predetermined code into the device 10. As will be further described, the entry of the preset code can be made mechanically or electronically. The latter entry method, particularly for use with a micro processor, permits the proprietor to use the keypad 11 to enter the predetermined code after the initial input of a programming code.

A power or energy source means 19, such as a battery or AC with an AC/DC converter is shown mounted to the interior top portion of the housing structure 28. The power source 19 provides the necessary current to the functional elements of the device 10 by means of connecting wires 23. A signal output means or relay unit 21 is also shown to be in communication to a solenoid valve 24 by means of connecting wires 22.

Further shown in FIG. 2 at the bottom of the housing 28 and above the article access slot or aperture 12 is a movable cover 26 having a slot or aperture 29. The elongated, flat cover 26 is attached to or integral with piston 25 of solenoid valve 24. In spacial alignment and circumferentially disposed above the aperture or opening 12 is an article storage means 32 comprised of an input chute or structure 31 for holding the article or key 42 on top of the slot cover 26 and in a position for subsequent exit through article access means 12 to a user.

The cover 26 is under tension by a resilient, spring or other biasing means 27 which is attached to the cover body 26 at one end and to the housing structure 28 at its opposite end. The solenoid valve 24 is shown mounted to the bottom of the housing 28 by a fastener member 60. Upon the entry of the preset code into the input pad 11, a signal is sent from the relay unit 21 to the solenoid valve 24 which causes the piston 25 to move inward relative to the valve body and to thereby align the slot 29 of cover 26 with the article access slot 12 to permit the article or key 42 to drop to an exterior accessible location 69 for the user. The spring or resilient means 27 causes the piston 25 and cover 26 to return to its original position to automatically reset the device 10 for subsequent use.

Figure 3:
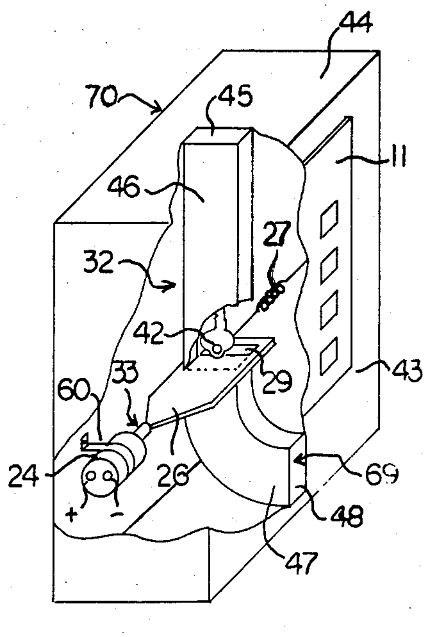
FIG. 3 is a perspective schematic cut-away view of the housing structure of another embodiment of a device according to the teachings of this invention which shows an alternative arrangement of operative elements contained therein.

FIG. 3 illustrates another embodiment of the article storage and release device of this invention. There shown, the front portion 43 of housing structure 70 has a top portion 44 wherein an aperture or slot 45 is located for receiving an article 42. An input chute 46 aligns with the aperture or slot 45 and it extends downward to the article release means 33. The article release means or mechanism 33 illustrated is similar to that shown in FIG. 2, except that it is mounted upwardly in the body structure 70 whereby the solenoid valve 24 is mounted to the back side of housing 70 by fastening clip 60.

An output chute 47 having an article access slot or opening 48 at the front portion 43 of housing 70 provides a user with an externally accessible location 69 to receive article 42 subsequent the entry of a predetermined code into the digital input pad 11. The top portion of output chute 47 is in spacial alignment with the bottom of input chute 46 so that the activation of solenoid valve 24, as discussed with respect to FIG. 2, causes the slot or aperture 29 of cover 26 to align with the bottom of input chute 46 and the top of output chute 47 and permit the article 42 to drop therethrough. The resilient means 27 subsequently resets the device and the key 42 after being used is dropped through aperture or ingress portion 45 for storage and future release.

Figure 4:
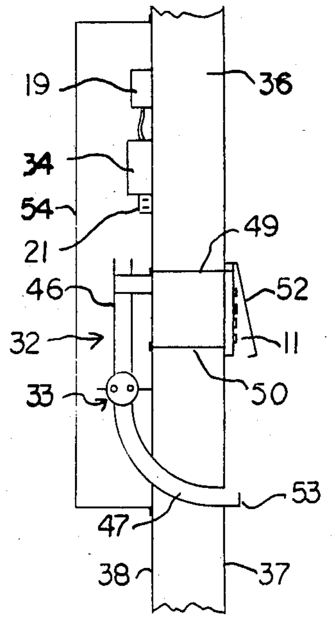
FIG. 4 is a schematic side plan view of another embodiment of the article storage and release device of this invention, wherein the operative elements of the device are mounted to the interior and exterior portions of a building wall structure.

FIG. 4 shows the digital input pad 11 mounted in a flush configuration to the exterior surface 37 of a building wall structure 36. The digital input or keypad 11 is secured by means of internally accessible fasteners 49 and 50, such as bolts or the like, to aid in preventing the removal or tampering of keypad 11 from the wall exterior. Additionally, to safeguard the device the computer logic or memory portion 34 is removed from the digital pad 11, which differs from the configuration illustrated in FIG. 2.

The output chute 47, as discussed in reference to FIG. 3, is located below the article release means 33 and is shown to extend through the wall structure 36 to enable the device user to receive the article or key 42 after the predetermined code has been properly entered. At the downward end of output chute 47 is an exteriorly exposed article holding member 53 to catch and hold the key 42 for the user. Also shown is a hinged keypad cover member 52 to protect the keypad 11 from rain, snow, etc. And, removably mounted on the interior portion 38 of wall structure 36 is an interior cover member 54 to protect the device elements.

FIGS. 6 and 7 illustrate alternate embodiments of the article release means or mechanisms 33 and which differ in structure from the article release mechanism described with respect to FIGS. 2 and 3. FIG. 6 shows an article release means 33 having a DC motor 39 with a shaft 58 having a cam 63 thereon. The shaft 58 protrudes through an apertured wall 56, and angularly extending upward from the end of the motor shaft 58 is an article holding member 59 to receive an article or a ring 61 attached to the article, such as a key 42. In communication with motor 39 is a magnetic latching relay 40, such as a silicon control rectifier (SCR), which is in communication with a microswitch 41 having a contact member 62 extending therefrom to cam 63 of motor shaft 58. These elements are wired to the relay unit 21 of the device 10, as discussed above. The SCR is normally in an open position so that when the signal is sent from relay unit 21, upon the entry of the predetermined code by a user, the actuation circuit described allows the motor 39 to complete one revolution of shaft 58 (the contact of microswitch member 62 with the cam 63 of shaft 58 stops the shaft rotation after one revolution). The angular disposition of member 59 causes the article 42 to drop therefrom during the revolution and into the output chute 47, for example.

FIG. 7 illustrates an article release mechanism 33 comprised of a solenoid valve 24 mounted in an angular upward position by fastener means 60. An elongated piston 55 moves inward relative to the valve body of valve 24 when activated by relay unit 21. The piston 55 is disposed and moves through the apertured walls 56 and 57, between which the ring 61 of article 42 is placed about piston 55. Thus, when the relay unit 21 is activated by the input of the predetermined code by a user, the movement of piston 55 causes the ring 61 to be removed therefrom and causing the article 42 to drop into output 47, for example. Apertured wall 57 is provided to safeguard the placement of ring 61 on piston 55, i.e., against shaking of device 10. However, if the device housing is stable, wall 57 may be omitted, and valve 24 with piston 55 may be disposed in a horizontal manner. Alternatively, wall 57 may be hinged to permit the proprietor to easily place ring 61, for example, onto piston 55.

FIG. 5 illustrates another embodiment of the invention. This arrangement is particularly designed for multi-unit dwellings or commercial buildings. This embodiment has a digital input pad 11 mounted to the exterior surface 37 of a wall 36. A single article receiving member 53 extends from the exterior surface 37 of the wall 36 to permit users to receive keys 42 at the externally accessible location 69.

As shown, behind wall 36 residents or occupants have access to article storage means 32 having a plurality of article release mechanisms 33 mounted on structure 54 to place their respective keys 42 and to preprogram their respective access codes. Located below the article release mechanisms is a funneled article chute 51 which extends downward and outward to exterior member 53.

Optionally, the residents or occupants are able to electronically program their predetermined codes directly into keypad 11, having first placed a program code function into the keypad 11. This configuration obviously differs from those discussed above, and would require the use of a computer logic unit, i.e., a programmed micro processor as known in the art, which is able to compare more than a single code and subsequently address more than a single corresponding article release mechanism 32.

FIG. 5 also illustrates an enclosed structure 66 having a visual screen 67 and a keypad unit 68, both being operative with a micro processor located within enclosure 66. The use of structure 66 permits a user to obtain a predetermined code from an intermediate source, i.e., visual screen 67. Subsequently, the user is able to enter the predetermined code into keypad 11 to receive key 42 for use on lock 65 of door 64, for example. The entry of a different predetermined code into pad 11, would provide a key usable on another door lock in the building.

The latter process is also usable for other systems which ultimately require the use of an article, such as a key. For example, a car rental company utilizing a machine structure 66 having a programmed computer therein with communication to a charge card system. A user upon entry of a charge card number or another user identifying code previously provided, for example, into keypad 68 will receive a predetermined code on screen 67 after the proper information requested has been verified. Thereafter, the user enters the predetermined code corresponding to a requested automobile model, into keypad 11 to receive the automobile keys for use. Such a device arrangement and process for key storage and release is suitable for use at airports, for example, and eliminates the requirement of personnel presence at the auto rental counter.

FIG. 8 is a schematic diagram which illustrates the operational process of this invention. The logic or computer memory portion 34 is in communication with the code input pad 11, the predetermined code setting means 35 and the energy or power source 19. Upon setting the predetermined code by the proprietor or operator of the device, and providing that code to a user, the proper input into pad 11 causes the relay unit 21 (or units 21 if plural use) to send a signal to release means 33 to release the article 42 from the article storage means 32 to an exterior accessible location 69 for the user.

As mentioned, the basic electronically operated units discussed above are known in the art. For example, one code receiving means having a code setting mechanism and an input mechanism is manufactured by Corby Industries, Inc. of Whitehall, PA. The devices known as "digital keys" are digital key pads utilized primarily to control and set alarm and security systems or to activate electrically operated doors.

The Corby key pad consists of a twelve (12) button key pad with a small computer mounted behind the pad. The key pad and accompanying electronics are mounted on a metal plate. And, the unit can be equipped with colored light emitting diodes for visual status indicating purposes, as discussed above.

The computer portion requires that five buttons be pressed in order, and the computer logic activated by five code setting switches or a five digit operating code, has the possibility of 95,040 predetermined codes which can be instantly selected and programmed into the unit. Should power failure of fluctuations in electrical input occur, the code entered will remain. Additionally the digital unit is resistant to radio transmissions and lightning strikes.

In essence, the device can be used to control any system that requires an electronic impulse. If the five digit code entered into the computer does not match the preset code, or is not entered in the proper sequence, the computer is instantly reset.

The Corby digital key pad additionally has a relay unit that is activated by the proper code entered via the twelve (12) button key pad into the computer. The unit itself is designed to be mounted flush to a wall.

The relay contacts close and remain in that position as long as the user continues to press the last code digit. The latter feature provides the user with the ability to keep the article release mechanism 33 in an open position to ensure that the article 42 drops through the slotted cover 26, for example. The relay contacts are either in an open or closed position, and after a momentary pulse is applied, the contacts change position. A loss of power will not change the pulse position.

The units can be provided in a weatherproof housing with spring loaded cover 52, as shown in FIG. 4, and with weather proof gaskets to both protect the keypad and to conceal it from sight. The lights 15 and 16 show system status and provide an incandescent night light so that the user can see the keypad during times of darkness. The units generally require an operating input voltage of 6 to 14 volts DC.

Another manufacturer of such digital units is Minnesota Mining and Manufacturing, which markets a unit known as "Electronikey". This unit is primarily designed as an entry system for automatic garage doors, and is mountable to a wall. The unit also has 12 input keys, and is programmable to receive over 20,000 predetermined codes. The units manufactured by 3M also have constructions which have the computer portion separate from the keypad portion. This configuration is preferrable for use with the device of this invention.

Figure 9:
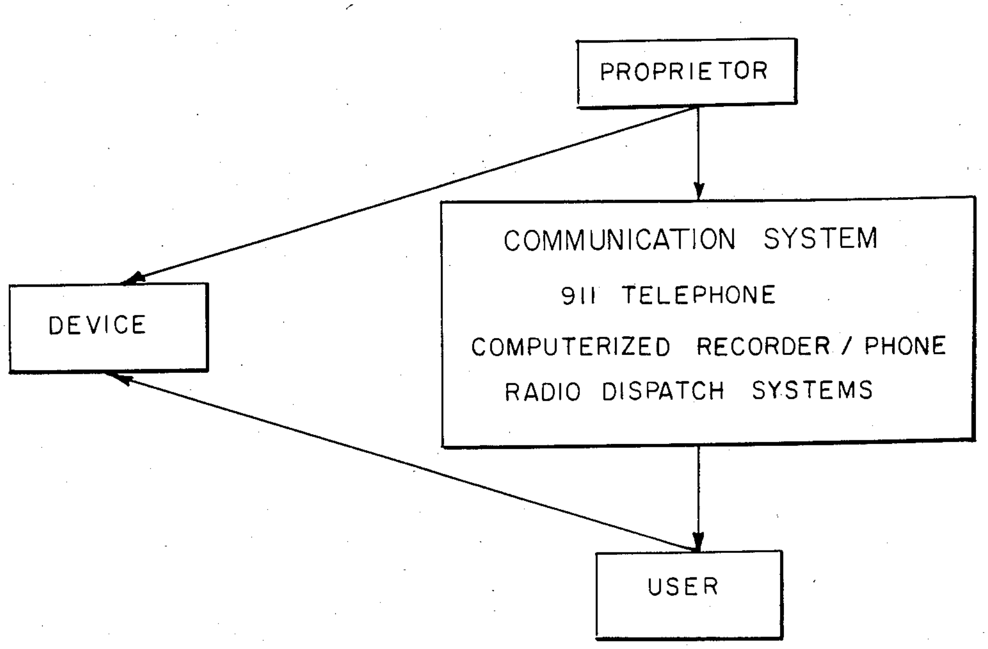
FIG. 9 is a schematic diagram which illustrates the process according to the teachings of this invention.

In summary, as is further shown in FIG. 9 the invention deals with an article storage and release device and methods that permit an individual or corporation to place a key, or other valuable and subsequently usable object, in a protected enclosure for subsequent release. For example, a homeowner is able to select and enter an operating code into the device and provide individuals, e.g., fireman, police, emergency medical personnel, guests, etc., access to the door key by divulging the four or five digit code. Subsequently, the key is simply placed back into the device, and if desired, the predetermined access code can subsequently be changed. Additionally, an auto rental company is able to store keys to selected automobiles in a multiple use device to provide users with a specific auto key upon the entry of a corresponding predetermined code. Additionally, the individual or proprietor can provide the predetermined code to a communication system, such as a 911 telephone system, a computerized system, a recorder/phone or a dispatch system, whereby the user is able to subsequently obtain the predetermined code for use on the article storage and release device.

Since many changes are possible to the embodiments and methods of this invention utilizing the teachings thereof, the descriptions above and the accompanying drawings, should be interpreted in the illustrative, and not in the limited sense.

That which is claimed is:

1. An automatically resetting and tamper resistant device for releasably storing an article from an internal secured location and for dispensing the article to an external location accessible to a user having been provided with a changeable predetermined code, said device comprising:

a. a tamper resistant structure having article storage means therein and being accessible to the proprietor of the device, said article storage means further being an article input chute having a generally open flat bottom portion for receiving and holding the article therein, b. a reciprocating tamper resistant article release means located spacially below said input chute in said tamper resistent structure and being in communication with an externally accessible location to a user, c. a logic unit having changeable code setting means for a proprietor to enter a predetermined code, a code input means located at an externally accessible location for input of the predetermined code by a user and signal output means in communication with said article release means, d. power source means in communication with said code setting means, logic unit, and code input means for activating said article release means to release the stored article to a user at the externally accessible location, e. said reciprocating article release means further being comprised of a solenoid valve having activatable and reciprocating piston means having an elongated and generally flat chute cover means connected thereto and extending outwardly therefrom, said solenoid valve being in communication with said signal output means, and said tamper resistant structure further having output chute means with a generally flat open top area in communication with the externally accessible location, said movable and reciprocating chute cover means for holding an article thereabove and being located spacially between said input and output chutes, said chute cover means further having an apertured portion extending therethrough, said apertured portion of said chute cover being spacially located outside the top of said output chute when being in its set position and having its apertured portion aligned with the interior of said input and output chutes when activated to permit the article to pass therethrough, f. said movable chute cover means additionally having resilient means attached in opposition to the solenoid valve piston movement so that said chute cover means is returnable to its original set position subsequent the activation of said solenoid valve to reset the chute cover with said aperture outside said input and output chutes for subsequent use, and g. said article input chute further being disposed above said chute cover means and being in spacial alignment with said output chute means, whereby said elongated and flat reciprocating chute cover means is located spacially between said flat input chute bottom portion and said flat output chute top portion and having said apertured portion located to the outside of said spacially aligned chutes when said chute cover is in its set position to ensure against tampering.

2. The device of claim 1, wherein said tamper resistent structure is a separable housing structure having access means thereinto, and wherein the logic unit, code setting means and the signal output means are disposed in said housing structure.

3. The device of claim 1, wherein said tamper resistent structure is comprised of a building wall structure having interior and exterior portions, and wherein said article release means, code setting means, logic unit, signal output means and power source means are disposed on the interior portion of said wall structure and wherein said code input means is disposed on the exterior portion of said wall structure.

4. The device of claim 3, wherein said device has a plurality of article release means and code setting means in communication with said logic unit and wherein a single chute means extends through said wall structure.

5. The device of claim 1, wherein the changeable code setting means is comprised of a plurality of insertable pins, and wherein the code input means is comprised of a numeric pad having a plurality of input keys.

6. The device of claim 1, wherein the logic unit is a code comparitor means and wherein the signal output means is a signal relay activated by said code comparitor.

7. The device of claim 1, wherein said power source means is selected from the group consisting of DC battery means and AC means having an AC/DC converter, and wherein said device additionally has power indicator means in proximity to the code input means, whereby a proprietor is able to visually detect the operability of said device.

8. An automatically resetting and tamper resistant article storing and dispensing device for providing an article to a user having been provided a predetermined input code, said device comprising:

a. a tamper resistent article receiving and storage means accessible to the proprietor of the device, said storage means further having an article input chute therein and having a generally open flat bottom portion, b. a changeable code receiving means, signal emitting means located inside said tamper resistant storage means, an externally accessible code input means, and code comparison means and a power source located inside said tamper resistant storage means, c. actuating means in communication with said signal emitting means for dispensing the stored article to an area external to said article storage means, d. access chute means being an output chute having an external access location at its end and being in communication with said actuating means for permitting the code input user to receive the article stored in said device, e. said article receiving and storage means further being comprised of a building wall structure having interior and exterior portions, said code input means being mounted for use to the exterior of said wall structure, said changeable code receiving and signal emitting means and said actuating means being mounted to the interior portion of said wall structure for tamper resistance purposes, and said wall structure further having an aperture therethrough for communication with said access means of said device, f. said actuating means being comprised of a solenoid valve having actuatable and reciprocating piston means in communication with said signal emitting means, and said output chute member having a generally flat open top portion extending from spacially below said actuating means to an external location, g. said actuating means additionally having a movable elongated and generally flat chute cover member attached to and extending outwardly from said reciprocating and actuatable piston means, said chute cover additionally having resilient means attached thereto and being in opposition to the movement of the actuatable piston means whereby said chute cover returns to its original position to reset the device for subsequent use, said chute cover having an apertured portion extending therethrough, said apertured portion of said chute cover further being spacially located outside the top of said output chute when being in its set position and having its apertured portion aligned with the interior of said input and output chutes when activated to permit the article to pass therethrough, and h. said article input chute open bottom portion being disposed immediately above said chute cover member, and said input chute further being spacially aligned with said flat open portion of said output chute member, whereby said flat chute cover reciprocates its apertured portion spacially therebetween to release the stored article and to ensure against tampering.

9. A method for storing and protecting an article for access to a predetermined user, said method comprising:

a. providing an automatically resetting and tamper resistant device for releasably storing an article from an internal secured location and for dispensing the article to an external location accessible to a user having been provided with a changeable predetermined code, said device comprising:

1. a tamper resistant structure having article storage means therein and being accessible to the proprietor of the device, said structure further having an article input chute having a generally open flat bottom portion for receiving and holding the article therein, 2. a reciprocating tamper resistant article release means located spacially below said input chute in said tamper resistent structure and being in communication with an externally accessible location to a user, 3. a logic unit having changeable code setting means for a proprietor to enter a predetermined code, a code input means located at an externally accessible location for input of the predetermined code by a user and signal output means in communication with said article release means, 4. power source means in communication with said code setting means, logic unit, and code input means for activating said article release means to release the stored article to a user at the externally accessible location, 5. said reciprocating article release means further being comprised of a solenoid valve having activatable and reciprocating piston means having an elongated and generally flat chute cover means connected thereto and extending outwardly therefrom, said solenoid valve being in communication with said signal output means, and said tamper resistant structure further having output chute means with a generally flat open top area in communication with the externally accessible location, said movable and reciprocating chute cover means for holding an article thereabove and being located spacially between said input and output chutes, said chute cover means further having an apertured portion extending therethrough, said apertured portion of said chute cover being located outside the top of said output chute when being in its set position and having its apertured portion aligned with the interior of said input and output chutes when activated to permit the article to pass therethrough, 6. said movable chute cover means additionally having resilient means attached in opposition to the solenoid valve piston movement so that said chute cover means is returnable to its original set position subsequent the activation of said solenoid valve to reset the chute cover with said aperture outside said input and output chutes for subsequent use, and 7. said article input chute further being disposed above said chute cover means and being in spacial alignment with said output chute means, whereby said elongated and flat reciprocating chute cover means is located spacially between said flat input chute bottom portion and said flat output chute top portion and having said apertured portion located to the outside of said spacially aligned chutes when said chute cover is in its set position to ensure against tampering, b. placing an article in said tamper resistant article storage means by the proprietor of said device, c. storing a predetermined code into the changeable code setting means by the proprietor of said device, d. providing a user with the predetermined code for input into the externally located code input means to release an article from the storage device to the externally located access means for subsequent use by the user, and e. activating of said tamper resistant article release means by the user by input of the predetermined code for releasing the article to the externally located access means from said tamper resistant device.

10. The method of claim 9, wherein the predetermined code is provided to a communication system for predetermined use, and wherein a user obtains the predetermined code from the communication system.

11. The method of claim 10, wherein the communication system provided is the 911 emergency telephone system, and wherein the users provided with the predetermined code is selected from a group consisting of firemen, policemen and medical personnel.

12. The method of claim 10, wherein the communication system provided is selected from the group consisting of a computerized dispatch system, a recorder/-phone dialing mechanism, a privately operated dispatch system, and a radio dispatch system.

13. The method of claim 10, wherein the communication system is provided by an automobile rental company, and wherein the predetermined code provided corresponds to a key for an automobile selected by a user.

* * * * *